A. TERESA.
DEPULPATING MACHINE.
APPLICATION FILED JAN. 16, 1913.

1,079,196.

Patented Nov. 18, 1913.
7 SHEETS—SHEET 1

WITNESSES
H. J. Walker
Geo. H. Beeler

INVENTOR
Antonio Teresa
BY Munn & Co
ATTORNEYS

A. TERESA.
DEPULPATING MACHINE.
APPLICATION FILED JAN. 16, 1913.

1,079,196.

Patented Nov. 18, 1913.
7 SHEETS—SHEET 2.

WITNESSES
H. J. Walker
Geo. L. Beeler

INVENTOR
Antonio Teresa
BY Munn & Co
ATTORNEYS

A. TERESA.
REPULPATING MACHINE.
APPLICATION FILED JAN. 16, 1913.

1,079,196. Patented Nov. 18, 1913.
7 SHEETS—SHEET 3.

WITNESSES
H. D. Walker
Geo. R. Beebe

INVENTOR
Antonio Teresa
BY Munn & Co
ATTORNEYS

A. TERESA.
DEPULPATING MACHINE.
APPLICATION FILED JAN. 16, 1913.

1,079,196.

Patented Nov. 18, 1913.
7 SHEETS—SHEET 5.

Fig. 6

WITNESSES
H. T. Walker
Geo. L. Beele

INVENTOR
Antonio Teresa
BY Munn & Co.
ATTORNEYS

A. TERESA.
DEPULPATING MACHINE.
APPLICATION FILED JAN. 16, 1913.

1,079,196.

Patented Nov. 18, 1913.
7 SHEETS—SHEET 7.

WITNESSES
H. D. Walker
Geo. L. Beele

INVENTOR
Antonio Teresa
BY
ATTORNEYS

UNITED STATES PATENT OFFICE.

ANTONIO TERESA, OF SAN LUIS POTOSI, MEXICO, ASSIGNOR OF ONE-FOURTH TO EDWARD H. HASKELL, OF NEWTON CENTER, MASSACHUSETTS, AND ROBERT DAWES, OF FRANKFORD, PHILADELPHIA, PENNSYLVANIA.

DEPULPATING-MACHINE.

1,079,196.  Specification of Letters Patent.  Patented Nov. 18, 1913.

Application filed January 16, 1913. Serial No. 742,490.

*To all whom it may concern:*

Be it known that I, ANTONIO TERESA, a subject of the King of Spain, and a resident of San Luis Potosi, in the State of San Luis Potosi and Republic of Mexico, have invented a new and Improved Depulpating-Machine, of which the following is a full, clear, and exact description.

This invention relates to machinery for operating upon fibrous or textile plants, and has particular reference to means for depulpating fibrous leaves of tropical or semitropical plants, whereby the fleshy or meaty body portion of the leaves is removed from the fibrous portions as distinguished from decorticating machines which are employed for removing the bark, skin, hull or rind from objects.

Among the objects of this invention is to construct a machine of the character indicated which is of a much more flexible and universal adaptation for operation upon various types or lengths of leaves than machines heretofore proposed.

Another object of this invention is to improve the means whereby the leaves may be fed or delivered to the machine and then acted upon by the machine in a continuous manner, one end of each leaf being stripped or depulpated and then subsequently, as the leaf progresses through the machine, the other end being treated.

The invention also includes numerous details of construction whereby the efficiency and general utility of the machine are greatly enhanced.

The foregoing and other objects of the invention will hereinafter be more fully described and claimed and illustrated in the drawings forming a part of this specification in which like characters of reference indicate corresponding parts in all the views, and in which—

The several parts of the machine may be made of any suitable materials and the relative sizes and proportions as well as the general design thereof may be varied to considerable extent without departing from the spirit of the invention hereinafter claimed.

Referring more particularly to the drawings I show a framework of any suitable nature including a base 10, a plurality of substantially rectangular vertical members 11, 12 and 13 and any suitable number of auxiliary transverse and longitudinal braces including a bridge 14 occupying a substantially mid position transversely and longitudinally.

Figure 2:
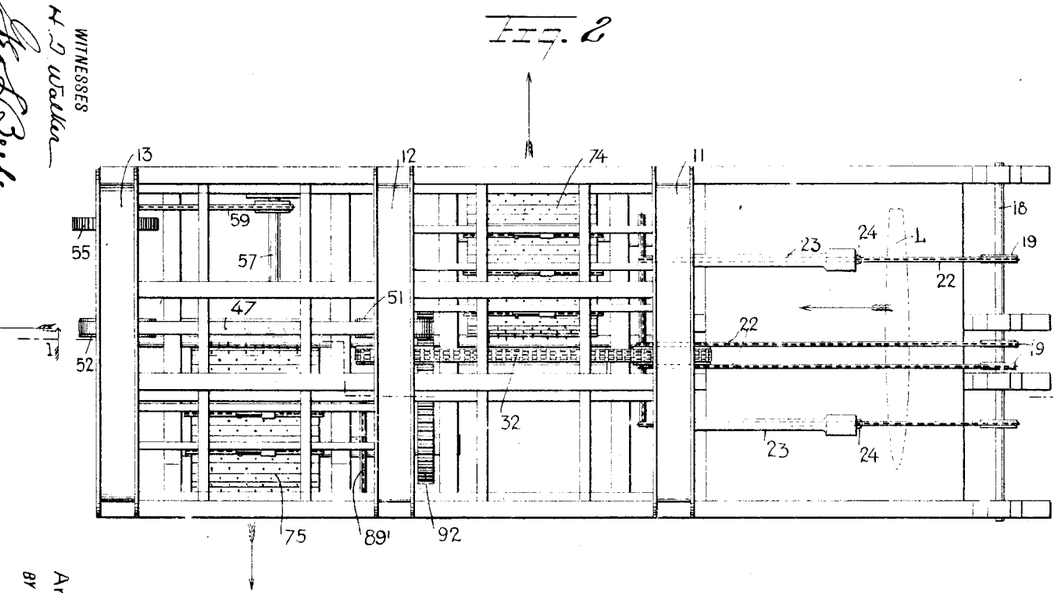
Fig. 2 is a plan view of the same.

At 15 is indicated a feeding table at the front of the machine upon and along which the leaves are fed in a transverse direction as indicated at L on Fig. 2. Said table is supported upon the main frame by means of brackets 16 and braces 17. At the front ends of the brackets 16 is journaled a shaft 18 having thereon a series of sprocket wheels 19. Just in the rear of the feeding table is journaled a transverse shaft 20, and upon this shaft are mounted a series of sprocket wheels 21 corresponding to the aforesaid wheels 19. A conveyer chain 22 operates over each pair of wheels 19 and 21, the upper runs of the chains operating over the table 15 and receiving the leaves as they are fed to the table.

Figure 1:
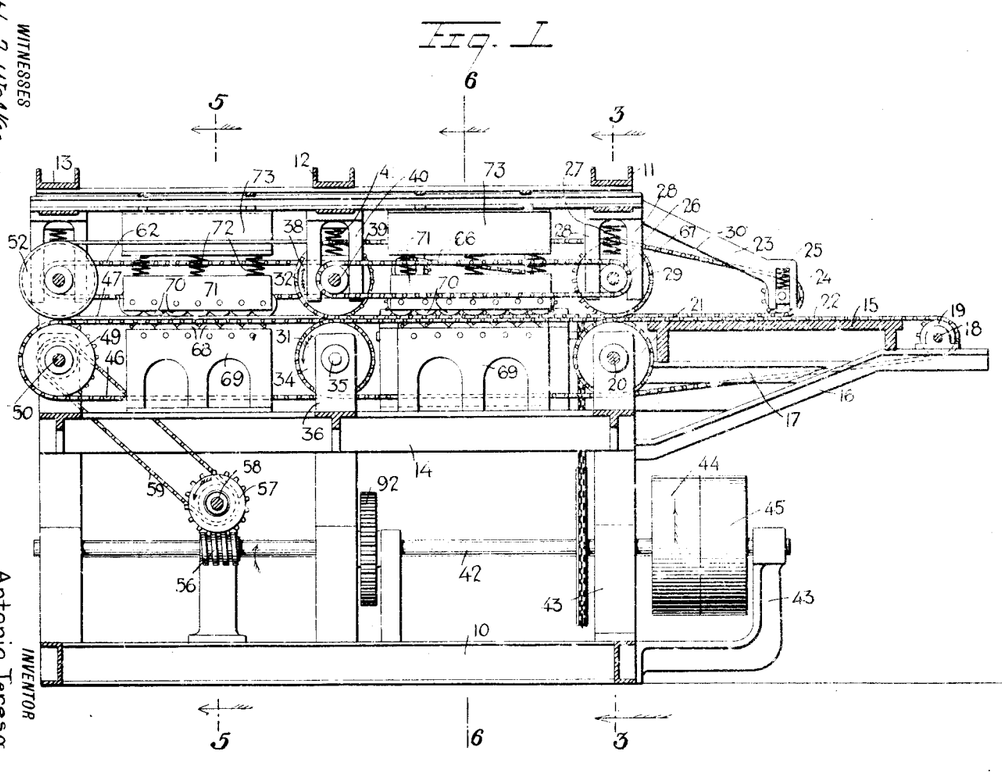
Figure 1 is a vertical longitudinal section of a preferred embodiment of this machine, taken substantially on the broken line 1—1 of Fig. 2.

A plurality of arms 23 are connected to the main frame near its top and extend thence forwardly and downwardly toward the middle portion of the table, as shown best in Figs. 1 and 2. A pair of sprocket wheels 24 are mounted in the front ends of the respective arms 23, and are resiliently maintained thrust downwardly toward the table by virtue of spring cushions 25. A transverse shaft 26 substantially parallel to the shaft 20 is journaled in the main frame and is adapted for a limited amount of vertical movement above said shaft 20. The shaft 26, however, is forced downwardly in proper operative relation to said shaft 20 by means of spring cushions 27. The shaft 26 is maintained in proper position with respect to the length of the machine by means of downwardly projecting auxiliary brackets 28. On this shaft 26 are mounted a plurality of sprocket wheels 29 which are directly in the rear of the respective wheels 24 and over each pair of wheels 24 and 29 operates an auxiliary conveyer chain 30, the lower run of which coöperates directly with one of the aforesaid chains 22, whereby the leaves received upon the chains 22 are positively carried rearwardly into position to be further treated by the continuous operation of the machine.

Extending longitudinally and substantially central of the machine is a gripper mechanism. This mechanism comprises in the front portion of the machine a pair of gripper chains or link belts 31 and 32. This pair of belts coöperate in a vertical plane one above the other and have adjacent runs in practically substantially close contact and in the plane of the feeding table, whereby they receive and hold between them the leaves as they are delivered thereto by the conveyer chains 22 and 30. The chain 31 operates over a pair of wheels 33 and 34 mounted respectively upon the shaft 20 and a short transverse shaft 35 supported upon bearings 36 extending upwardly from the middle of the bridge 14. The other chain 32 is similarly supported upon a pair of wheels 37 and 38 mounted respectively upon the shaft 26 and a transverse shaft 39 parallel to the shaft 35 and movable vertically with respect thereto within downwardly projecting brackets 40. Said shaft 39 is normally pressed downwardly toward the shaft 35 by virtue of spring cushions 41.

The numeral 42 indicates the main power shaft journaled adjacent the lower portion and longitudinally of the machine in bearings 43. The shaft is adapted to be operated from any suitable outside power transmitted thereto through a fixed pulley 44 adjacent which is arranged a loose pulley 45.

Said gripper mechanism also includes a pair of endless members in the rear portion of the machine, shown in this instance as comprising a lower chain or link belt 46 and an upper coöperating belt 47 made preferably of rubber or some suitable composition of metal, rubber or fabric. These gripper members 46 and 47 coöperate with each other in a manner similar to the belts 31 and 32 but in a plane slightly offset laterally from the plane of the first pair of gripper belts but parallel thereto, as indicated best in Fig. 2. The chain 46 is mounted upon a pair of wheels 48 and 49 mounted respectively upon the shaft 35 and a shaft 50 journaled transversely at the rear end of the frame. Likewise the belt 47 is mounted upon a pair of flanged wheels 51 and 52 mounted respectively upon the shaft 39 and a shaft 53 journaled at the rear of the machine above and parallel to the shaft 50. The shafts 50 and 53 are connected for simultaneous rotation in opposite directions by a pair of gears 54 and 55. Power from the main shaft 42 is transmitted to the gripper and conveyer mechanisms in the following manner: A worm 56 connected to said shaft 42 meshes with and rotates at slow speed a worm 57 mounted upon a transverse shaft 58 in front of but parallel to the shaft 50. A chain 59 operating over a pair of sprocket wheels 60 and 61 on the shafts 58 and 50 respectively transmits the power from the shaft 58 to the shaft 50, whereby the shafts 50 and 53 and gripper chain wheels connected thereto are operated positively. In order, however, for the driving power to be transmitted positively throughout the machine, I prefer to provide a sprocket chain connection at 62 between a sprocket wheel 63 on the shaft 53 and a similar wheel 64 on the shaft 39, and on the same shaft is another wheel 65 which transmits the power of said shaft through a sprocket chain 66 to a front sprocket wheel 67 mounted on the shaft 26. The rotation of the shafts 20 and 26 as herein described from the gripper mechanism insures satisfactory operation of the conveyer mechanism.

The upper run of each of the lower gripper belt chains is supported by any suitable number or specific construction of idlers 68 journaled on transverse axes in upwardly extending bearings 69 supported upon the bridge 14. The lower runs of the upper gripper belts are likewise resiliently pressed downward into coöperation with the lower belts by means of a series of idlers 70 mounted in boxes 71 having elastic connection through springs 72 with brackets 73 suspended from the top frame. By virtue of the several flexible supports for the upper portions of the gripper and conveyer mechanisms, the machine readily adapts itself to various thicknesses of leaves or material operated upon.

Figures 7, 8, 9:
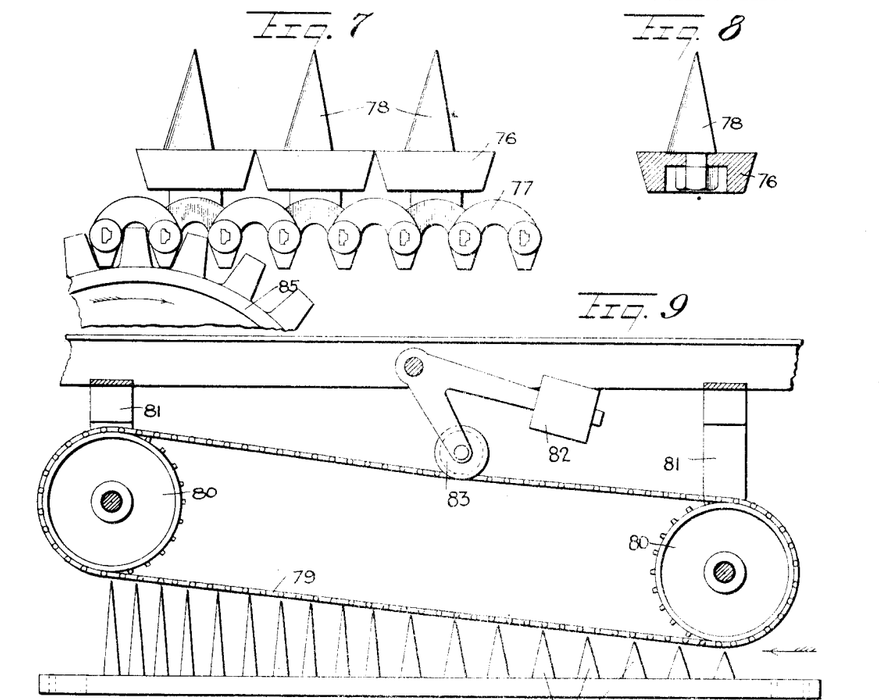
Figs. 7 and 8 are details of construction of the depulpating aprons.
Fig. 9 is a side elevation of the presser mechanism.
Figure 10:
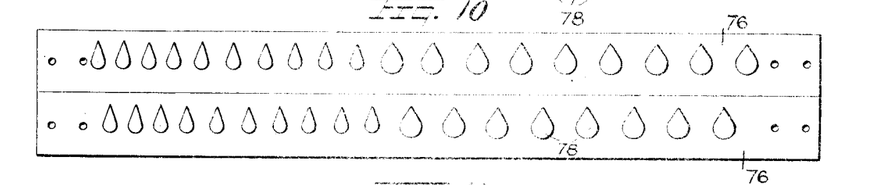
Fig. 10 is a plan view of an adjacent pair of depulpating apron plates.
Figure 11:
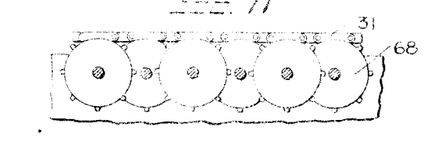
Figs. 11, 12, 13 and 14 are representations of various forms of gripper chains and means for supporting the same.
Figure 12:
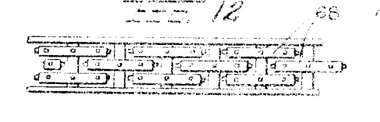

The depulpating mechanism proper comprises a pair of aprons 74 and 75, the one acting toward the right as viewed from the front of the machine, and the other acting at the rear end of the machine toward the left, the direction of operation of the several parts being indicated by arrows on Fig. 2. Each apron is made up in any suitable length by means of a plurality of parallel plates 76 connected together by means of interchangeable links 77 of any suitable or well known type. Each of the plates 76 carries a series of teeth 78 which project from one face thereof in different lengths, the length increasing toward the rear of the machine; that is to say, the shorter teeth, as indicated in Fig. 9, acting upon the leaves in the first instance, and the depulpating operation being completed by the longest teeth on each apron. I prefer to construct these teeth of non-corrosive metal, but any other suitable strong material may be used.

A leaf carried by the conveyer mechanism rearwardly into engagement by the gripper chains 31 and 32 will be carried by them rearwardly along or in proximity to the depulpating apron 74, whereby the depulpating will be performed upon one end of such leaf by this apron, the leaf in its natural state being gripped at substantially its middle portion by said gripper chains and the left hand end of the leaf being subsequently acted upon by the apron 75 while the depulpated end thereof is gripped between the gripper members 46 and 47 in the latter half of the operation. The planes of the several gripping members being offset as indicated insures that the entire leaf will be treated as it progresses directly through the machine from front to rear.

I provide for maintaining the leaves downward in proper position to be acted upon by the teeth 78 certain presser mechanism shown in several of the views but in Fig. 9 in particular. This mechanism includes a series of endless belts or chains 79 operated over a pair of wheels 80 supported by downwardly extending brackets 81, the lower run of such belt being maintained close to and substantially parallel to the points of the teeth 78, and this result being effected by means of a counterweight 82 acting through an idler 83 bearing upon the upper run of the belt. Any suitable number of these presser belts 79 may be employed in connection with each apron.

The apron 74 is supported upon and operated by pairs of sprocket wheels 84 and 85 mounted respectively upon shafts 86 and 87 at the front portion of the machine. The rear apron is likewise supported upon a pair of sprocket wheels 84' and 85' mounted upon shafts 86' and 87'. All of these shafts are journaled in brackets 88 extending upwardly from the bridge. The front apron is driven from the main shaft 42 by means of a sprocket chain 89 operating over a pair of sprocket wheels 90 and 91 mounted respectively upon the power shaft and the shaft 86. The speed of the apron is high compared with that of the conveyer and gripper mechanisms. The rear apron 75 is driven from the power shaft by means of a sprocket chain 89' operating over a pair of sprocket wheels 90' and 91' mounted respectively upon a shaft 42' and the shaft 86'. The countershaft 42' is driven from the power shaft by means of intermeshing gears 92.

Figure 13:
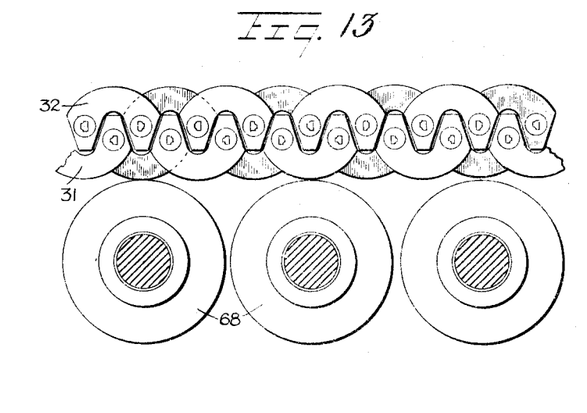
Figure 14:
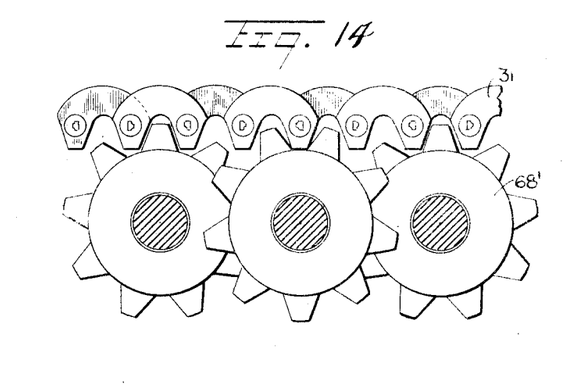

The gripper chains 31 and 32 may coöperate in any suitable manner either by surface contact, as indicated in Fig. 1, or by serrated or toothed contact, as indicated in Fig. 13. As shown in Fig. 14, either of the gripper chains may be supported by idlers 68' having teeth intermeshing with portions of such chain.

Figure 15:
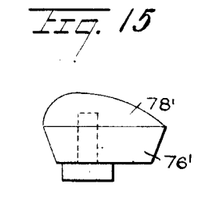
Figs. 15, 16 and 17 are respectively side, rear and plan views of a modified form of teeth which may be used in connection with the depulpating aprons.
Figure 16:
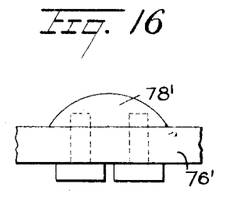
Figure 17:
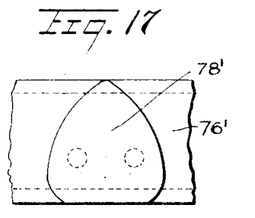

As suggested in Figs. 15, 16 and 17, some of the plates 76' may be provided with duller or blunter teeth 78', and these plates may be interspersed with those previously described.

Figure 3:
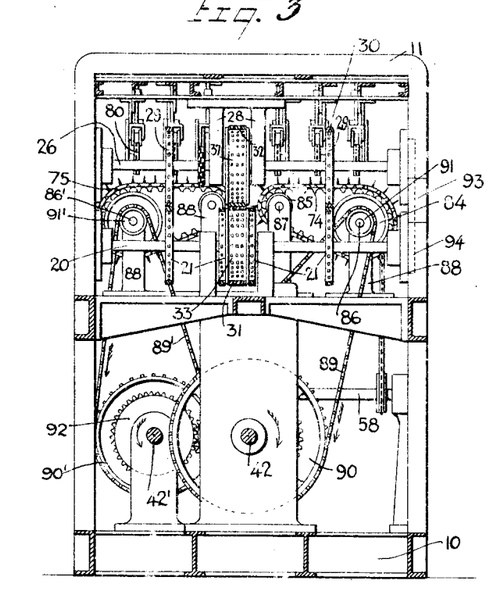
Fig. 3 is a vertical transverse section substantially on the line 3—3 of Fig. 1.
Figure 4:
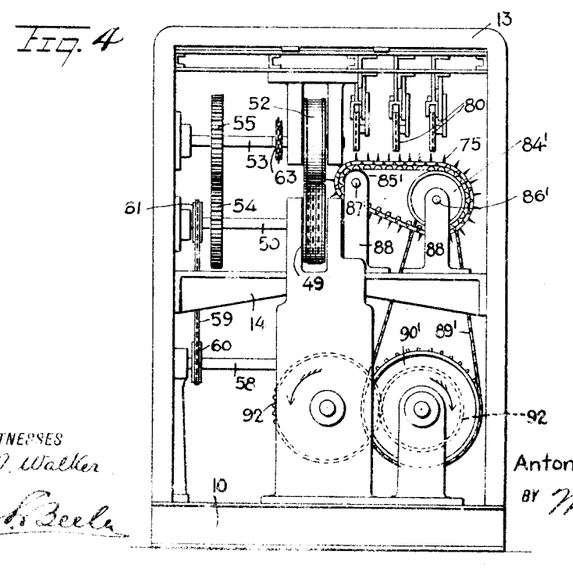
Fig. 4 is a rear elevation.
Figure 5:
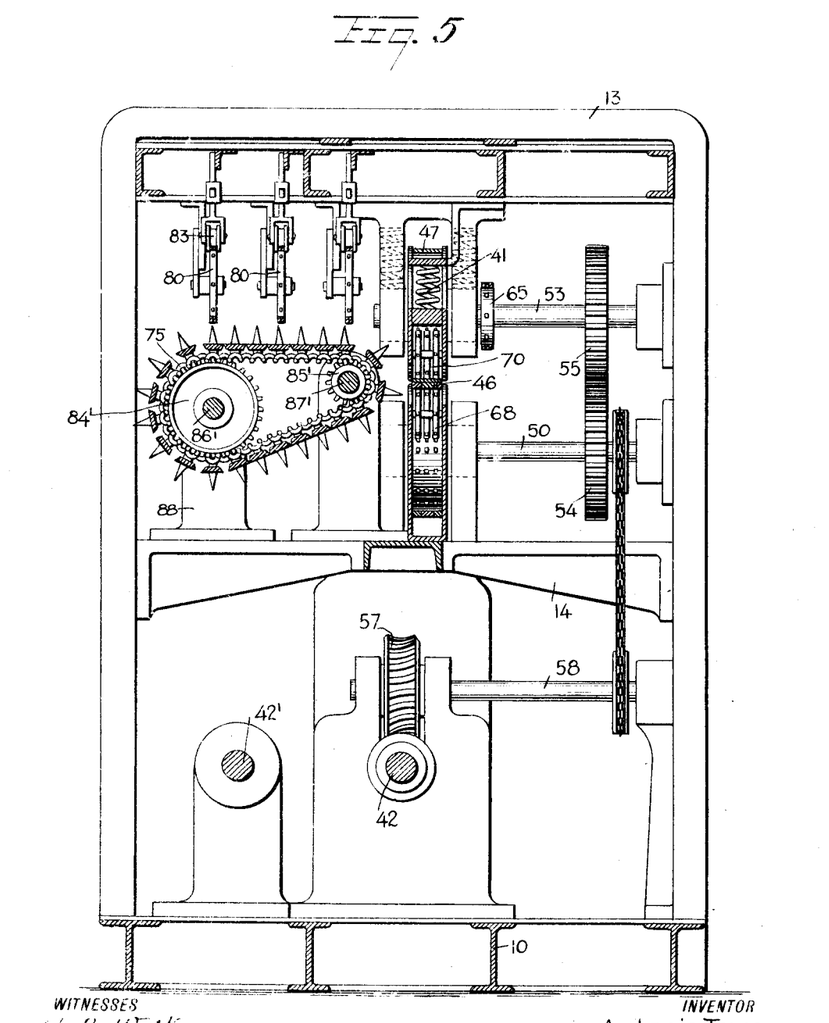
Fig. 5 is a vertical transverse section substantially on the line 5—5 of Fig. 1, looking toward the rear.
Figure 6:
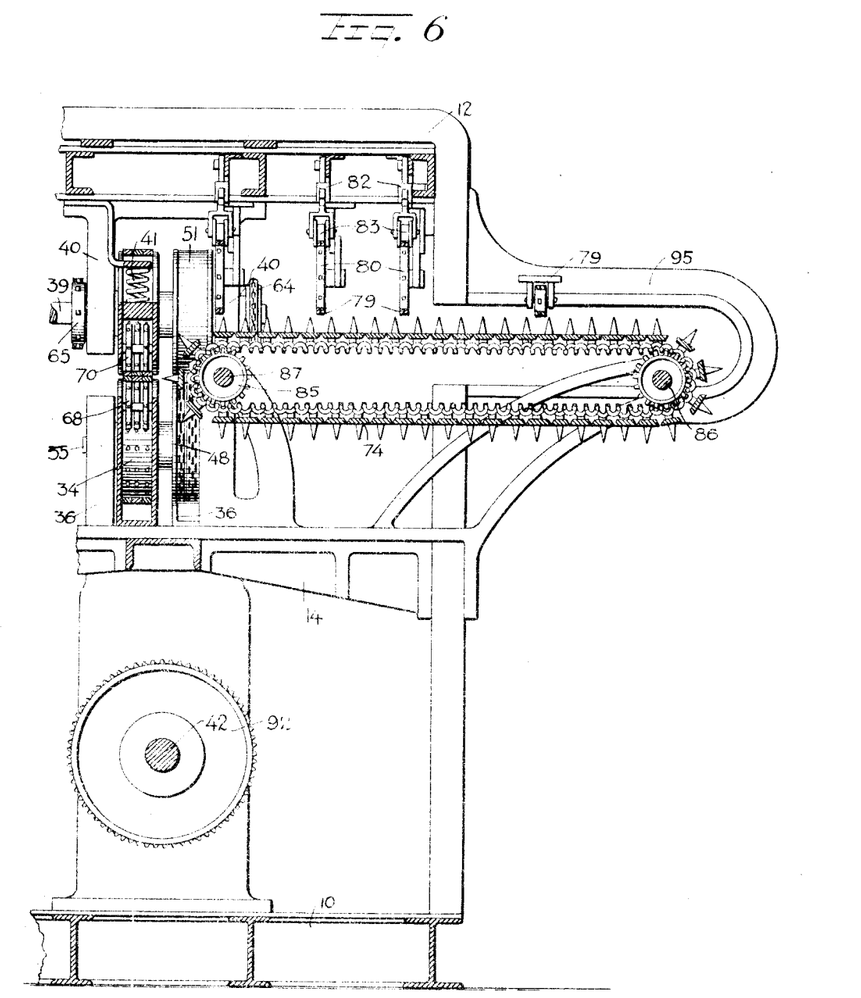
Fig. 6 is a partial vertical section indicating a variation in adaptation of the machine, the section being as though taken on the line 6—6 of Fig. 1, looking toward the arrow.

In ordinary practice, leaves of different species or even leaves of the same species taken from different parts of the field may be of several different lengths. With a machine arranged and shown for instance in Fig. 3, and made of practically commercial size, it would be impractical to operate upon the longer types of leaves for the reason that the ends thereof would tend to strike against the sides of the frame while the leaves are being carried through the machine. I therefore construct the machine so that it may readily be made to accommodate the longer leaves when necessary. To this end I provide the upright frame members with detachable sections 93 held in place by any suitable means as indicated at 94 when the machine is in the more compact form. All that is necessary to adapt the machine for longer leaves is to remove such sections 93 by loosening the plates 94 and apply over the gaps thus formed in the frame a series of extensions or U-frames 95. By reason of the fact that the aprons are made as already described, the length thereof may be increased accordingly and the shafts 86 will be journaled adjacent the outer ends of said U-frames. The sprocket chains 89 will accordingly be lengthened in an obvious manner whereby the aprons 74' may operate from the main shaft in precisely the same manner as that already described. The form of the extensions or U-frames constructed as illustrated in Fig. 6 will accommodate the longest leaves.

Having thus described my invention, I claim as new and desire to secure by Letters Patent:—

1. In a machine of the character set forth, the combination with depulpating mechanism including a plurality of movable teeth and means to support and operate said teeth, of presser mechanism including an endless idler belt operating transversely of the direction of movement of said teeth, and means to maintain one run of said belt in substantially close relation to the points of the teeth.

2. In a machine of the class set forth, the combination of depulpating mechanism including a plurality of teeth, means to support and operate said teeth in a certain direction, a presser mechanism including an endless belt arranged over and in close relation to said teeth, said belt being movable in a direction transverse to the movement of the teeth, and automatically operating tightening means for said belt, substantially as set forth.

3. In a depulpating machine, the combination of a series of teeth of varying lengths operating in a plane parallel to one another in a certain direction, means to support and operate said teeth, a presser mechanism including an endless belt, the lower run of which is in a plane closely adjacent and parallel to the aforesaid plane, the belt operating idly in its plane in a direction transverse to the movement of the teeth, and an automatically operating tension device to maintain the lower run of said belt substantially parallel to all the points of the series of teeth.

4. In a depulpating machine, the combination of a frame having removable side sections, auxiliary frame sections adapted to be secured to the frame, depulpating mechanism including an endless apron movable across said frame with one portion adjacent said side sections and of variable length, said auxiliary frame sections being adapted to conform to and support the adjacent portion of said depulpating apron in accordance with its alteration in length; and means to operate either length of the apron from the same source of power.

In testimony whereof I have signed my name to this specification in the presence of two subscribing witnesses.

ANTONIO TERESA.

Witnesses:
 GEO. L. BEELER,
 PHILIP D. ROLLHAUS.